(12) United States Patent
Hwang et al.

(10) Patent No.: US 8,762,729 B2
(45) Date of Patent: Jun. 24, 2014

(54) GROUP SIGNATURE SYSTEM AND METHOD PROVIDING CONTROLLABLE LINKABILITY

(75) Inventors: Jung Yeon Hwang, Daejeon (KR); Sokjoon Lee, Daejeon (KR); Gun Tae Bae, Daejeon (KR); Yun-Kyung Lee, Daejeon (KR); Hyeran Mun, Daejeon (KR); Sang-Woo Lee, Daejeon (KR); Sin Hyo Kim, Daejeon (KR); Byung Ho Chung, Daejeon (KR); Hyun Sook Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 85 days.

(21) Appl. No.: 13/079,588

(22) Filed: Apr. 4, 2011

(65) Prior Publication Data

US 2012/0084567 A1 Apr. 5, 2012

(30) Foreign Application Priority Data

Oct. 4, 2010 (KR) ........................ 10-2010-0096561

(51) Int. Cl.
*H04L 9/32* (2006.01)
*G06Q 20/00* (2012.01)

(52) U.S. Cl.
USPC ................ 713/176; 713/158; 705/74; 705/75

(58) Field of Classification Search
USPC ......... 726/4, 8, 9, 17; 709/203; 713/176, 158, 713/193; 380/44
See application file for complete search history.

(56) References Cited

U.S. PATENT DOCUMENTS

| | | | | |
|---|---|---|---|---|
| 6,298,153 | B1 * | 10/2001 | Oishi | 382/186 |
| 2004/0260926 | A1 * | 12/2004 | Arditti Modiano et al. | 713/170 |
| 2005/0097316 | A1 * | 5/2005 | Kim | 713/163 |
| 2008/0091941 | A1 * | 4/2008 | Yonezawa et al. | 713/158 |
| 2008/0152130 | A1 * | 6/2008 | Teranishi | 380/30 |
| 2008/0172559 | A1 * | 7/2008 | Yellepeddy | 713/158 |

(Continued)

FOREIGN PATENT DOCUMENTS

| | | |
|---|---|---|
| JP | 2010-103623 A | 5/2010 |
| KR | 1020100018043 A | 2/2010 |

OTHER PUBLICATIONS

Zhang Jianhong; Chen Hua; Gao Shengnan; Geng Qin, "On the Linkability of Two Schnorr Type ID-Based Blind Signature Schemes," Computer Science-Technology and Applications, 2009. IFCSTA '09. International Forum on , vol. 2, no., pp. 265,269, Dec. 25-27, 2009.*

(Continued)

*Primary Examiner* — Linglan Edwards
*Assistant Examiner* — Vu V Tran (57) ABSTRACT

A group signature system includes: a key issuer server for generating a first parameter of a group public key, generating a corresponding master issuing key, and issuing a signature key to a user when a user device joins; an opener server for generating a second parameter of the group public key, and a corresponding master opening key and master linking key; and a linker server for checking whether two valid signatures have been linked by using the master linking key when the two signatures corresponding to a group public key are given. The group signature system further includes: a signature verifying unit for confirming a validity of the given signatures and a signer information confirming unit for confirming a validity of singer confirming information generated by the opener server.

17 Claims, 8 Drawing Sheets

(56) References Cited

U.S. PATENT DOCUMENTS

| | | | |
|---|---|---|---|
| 2009/0041249 A1* | 2/2009 | Tanaka et al. | 380/277 |
| 2009/0055649 A1* | 2/2009 | Takata et al. | 713/171 |
| 2009/0089575 A1* | 4/2009 | Yonezawa et al. | 713/156 |
| 2009/0208000 A1* | 8/2009 | Yoshioka | 380/42 |
| 2009/0210705 A1* | 8/2009 | Chen | 713/158 |
| 2009/0210716 A1* | 8/2009 | Chen | 713/176 |
| 2009/0276630 A1* | 11/2009 | Teranishi | 713/176 |
| 2009/0300349 A1* | 12/2009 | Hashimoto et al. | 713/156 |
| 2010/0169656 A1* | 7/2010 | Yoshida et al. | 713/180 |
| 2010/0195834 A1* | 8/2010 | Amagai | 380/277 |
| 2011/0179269 A1* | 7/2011 | Furukawa | 713/156 |

OTHER PUBLICATIONS

Zuowen Tan, "An Improved Identity-Based Group Signature Scheme," Computational Intelligence and Security, 2009. CIS '09. International Conference on , vol. 1, no., pp. 423,427, Dec. 11-14, 2009.*

Guohua Cui; Jianhua Zhu; Shiyang Zhou "A Group Signature Scheme with Multiple Strategies from Bilinear Pairings", Education Technology and Computer Science, 2009. ETCS '09. First International Workshop on, on pp. 848-852 vol. 3, Mar. 7-8, 2009.*

Efficient zero-knowledge identification schemes which respect privacy Julien Bringer, Hervé Chabanne, Thomas Icart ;Mar. 2009 ASIACCS '09: Proceedings of the 4th International Symposium on Information, Computer, and Communications Security.*

Jung Yeon Hwang et al., "Group Signatures with Controllable Linkability for Dynamic Membership", ISO/IEC, Apr. 8, 2010, pp. 1-25.

Jung Yeon Hwang et al., "Group Signatures with Controllable Linkability for Dynamic Membership", Proceedings of ACM CCS'IO, Apr. 19, 2010, pp. 1-12.

Dan Boneh et al., "Short Group Signatures", Advances in Cryptology—CRYPTO 2004, 2004, pp. 41-55, vol. 3152 of Lecture Notes in Computer Science, Springer-Verlag, Berlin.

* cited by examiner

GROUP SIGNATURE SYSTEM AND METHOD PROVIDING CONTROLLABLE LINKABILITY

CROSS-REFERENCE(S) TO RELATED APPLICATION

The present invention claims priority of Korean Patent Application No. 10-2010-0096561, filed on Oct. 4, 2010, which is incorporated herein by reference.

FIELD OF THE INVENTION

The present invention relates to an cryptographic group signature scheme, and more particularly, to a group signature system and method which provide anonymity and linkability controllable in various levels, whereby a signature generated by an authorized user of a group superficially verifies that a user among group members has simply generated a signature with respect to a message, and when a particular opening key is given, the signer can be checked and when a particular linking key is given, the fact that signature values are linked (namely, they have been generated by a signing key) can be checked.

BACKGROUND OF THE INVENTION

In general, a group signature scheme, which is one of very important cryptographic authentication schemes for protecting user's privacy, has been widely studied. The group signature scheme, concept of which was first proposed by Chaum and Heyst in 1991, has since greatly developed, and numerous substantial schemes thereof, as well as formal models with respect to security requirements, have been also proposed.

In addition, an effective anonymity authentication scheme, which may replace an ID/password authentication scheme and a real name-based PKI authentication scheme involving many problems such as an exposure of personal information, a service provider's excessive collecting of personal information, and a leakage caused by a management carelessness in the process of registering and confirming personal information, and the like, and an i-Pin scheme involving a problem of extensive behavior tracking, has been actively studied in recent years.

However, the traditional group signature scheme simply handles anonymity with a dichotomous structure of concealing and recovering a signer's ID and thus is not sufficient to be adopted in an actual application environment. The reason is because the side that uses services prefers the merits of perfect anonymity but the side that provides services cannot easily achieve its original purpose obtained from providing the services only with anonymity.

For example, in a web-based anonymity authentication service, various personalized services as well as good quality services cannot be provided. Also, in case of data mining, it would be difficult useful information obtained from anonymity authentication data.

Therefore, in order to solve such problems, a development of a group signature scheme or the like, which may be able to control various anonymity levels in a practical point of view and excellent in terms of performance, is urgently required.

In addition, in order to design and develop the effective group signature schemes providing the above-mentioned anonymity characteristics, an existing linear encryption (LE) scheme of a bilinear group is not sufficient, and a novel cryptographic scheme which is structurally flexible and able to efficiently encrypt multiple pairs of messages needs to be also developed together.

Meanwhile, various group signature schemes have been suggested to provide anonymity authentication so far; however, they adopt a simple structure in which anonymity is processed such that a signer's ID is concealed in a generated signature and when a master opening key is given, the signer's ID is recovered. Such method is not sufficient to be utilized in an actual application environment. A problem arises in that, although the side that uses services prefers the merits of anonymity, the side that provides services cannot easily achieve a useful purpose for providing the services only with anonymity.

For example, when a web-based anonymity authentication service is considered, a service provider requires user information (e.g., a user's consumption pattern) in the form of anonymity, and if this is not supported, various personalized services and good quality services in association therewith cannot be provided. Also, in case of data mining, it would be difficult to obtain useful information from anonymity authentication data depending on a developer-desired method.

SUMMARY OF THE INVENTION

Therefore, the present invention provides a novel type group-based anonymity signature scheme required for diversifying the level of anonymity by overcoming limited controlling of anonymity of an existing group signature scheme. More specifically, the present invention provides a group signature system and method which divide the concept of anonymity into various levels by employing a controllable linkability and provides a corresponding control method. Namely, only when a particular key is given, connection information between signer IDs or signature values is confirmed and thus anonymity can be controlled.

The present invention is further provides a linear combination encryption (LCE) scheme and a hybrid linear combination encryption (HLCE) scheme obtained by extending the LCE scheme. These schemes may be essentially used to design a group signature scheme and may be also significantly used to independently design a different cryptographic scheme. These cryptographic schemes may stably and efficiently encrypt multiple messages in an algebraic group in which a decisional Diffie-Hellman (DH) problem is easy, for example, in bilinear group defined for bilinear pairings.

In accordance with an aspect the present invention, there is a group signature system including: a key issuer server for generating a first parameter of a group public key, generating a corresponding master issuing key, and issuing a signature key to a user when a user device joins;

an opener server for generating a second parameter of the group public key, and a corresponding master opening key and master linking key; and a linker server for checking whether two valid signatures have been linked by using the master linking key when the two signatures corresponding to a group public key are given.

In accordance with another aspect of the present invention, there is provided a group signature method including: generating, by a key issuer server, a first parameter of a group public key, and generating a corresponding master issuing key; issuing a signature key to a user device when the user device joins; generating, by an opener server, a second parameter of the group public key, and a corresponding master opening key and master linking key; and checking, by a linker server, whether two valid signatures have been linked by using the master linking key when the two signatures are given.

In accordance with still another aspect of the present invention, there is provided a method for generating a group public key: generating, by a key issuer server, a first parameter of a group public key and defining a corresponding master issuing key; defining, by an opener server, a master opening key and a master linking key, generating a second parameter of the group public key, and providing the generated second parameter to the key issuer server; and combining, by the key issuer server, the first and second parameters to generate the group public key.

In accordance with still another aspect of the present invention, there is provided a method for updating a group public key including: releasing, by a key issuer server, a revocation list for updating keys when a session is changed; generating, by the key issuer server, a new group public key and providing the new group public key to a user device; updating, by the user device, the group public key with the new group public key; and updating, by the user device, a signature key corresponding to the new group public key.

In accordance with still another aspect of the present invention, there is provided a method for generating a signature key including: receiving, at a key issuer server, a subscription request message from a user device; verifying, by the key issuer server, a validity of the subscription request message; receiving a signature with respect to the verified subscription request message from the user device; verifying, by the key issuer server, a validity of the signature to register the user device; and generating, by the user device, a secrete signature key corresponding to a group public key.

In accordance with still another aspect of the present invention, there is provided: a method for encrypting a message including: defining, by an opener server or a recipient, a public key, and storing a secret key corresponding thereto; outputting, by a message sender or a user device, a cryptogram regarding its message by using the public key; and calculating, by the opener server or the recipient, the cryptogram by using the secret key to recover the original message.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Hereinafter, the embodiments of the present invention will be described with reference to the accompanying drawings which form a part hereof.

Figure 1:
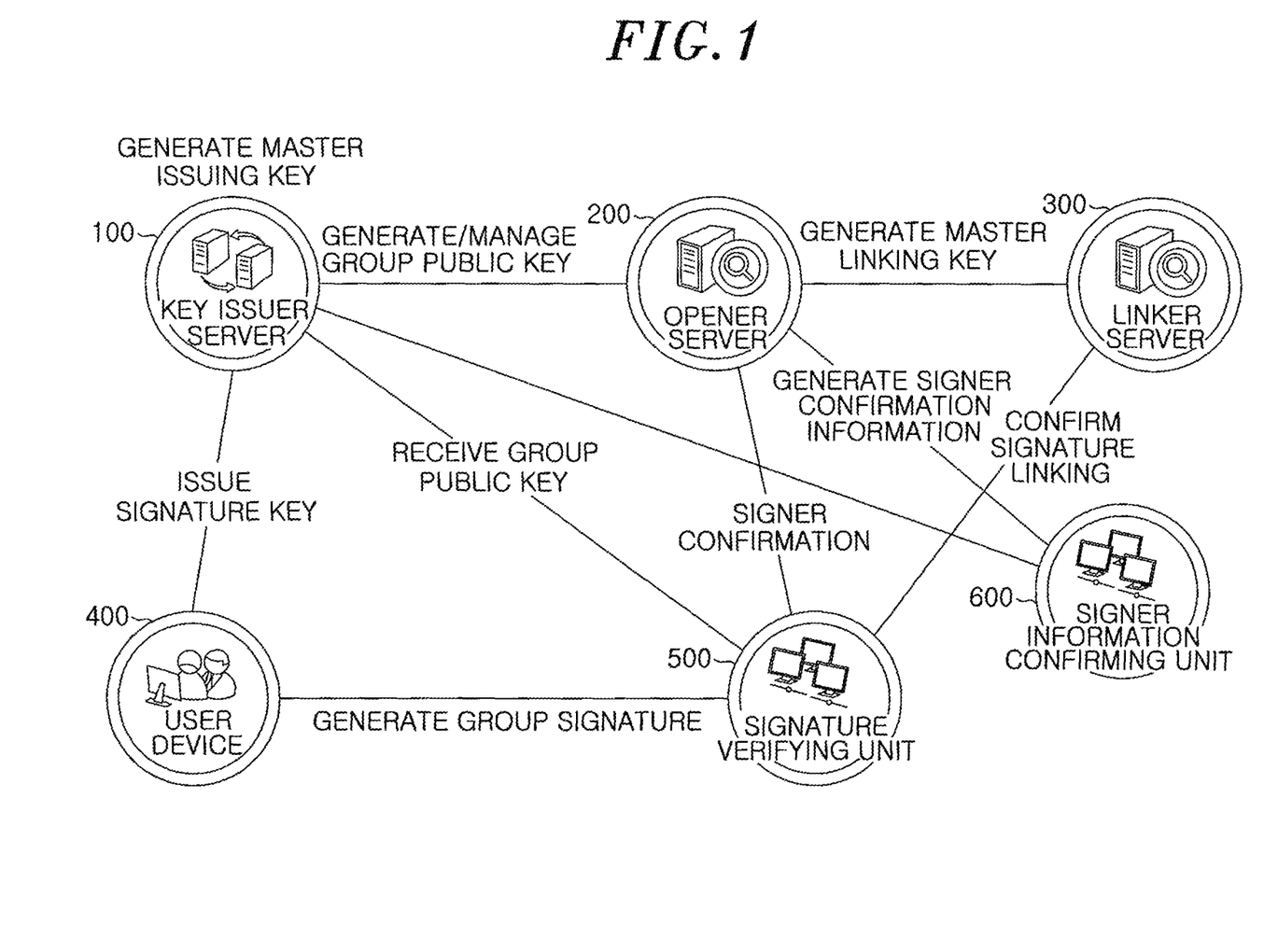
FIG. 1 is a view illustrating a group signature system providing a controllable linkability in accordance with an embodiment of the present invention.

FIG. 1 is a view illustrating a group signature system providing a controllable linkability in accordance with an embodiment of the present invention.

Referring to FIG. 1, the components that participate in the scheme in accordance with the present invention roughly include a key issuer server 100, an opener server 200, a linker server 300, a user device 400, a signature verifying unit 500, and a signer information confirming unit 600. Here, the servers 100 to 300 may be understood as a concept of an algorithm that outputs a particular value with respect to a given input value. The configuration of the participants is not limited herein but the roles of participants may be flexibly separated or integrated (e.g., integrating the key issuer server 100 and opener server 200 or integrating the opener server 200 and the linker server 300) based on a definition of a new object depending on a design method, and a new participant may be defined to interwork with a known real name authentication scheme, if necessary.

The key issuer server 100, which is a reliable object, initially generates first group public parameters (gpp1), and generates a corresponding master issuing key (mik). When a new user device is joined, the key issuer server 100 run an interactive protocol and issues a signature key to the user device.

When a key revocation occurs, the key issuer server 100 releases information regarding a revocation list, and, when participants require, the key issuer server 100 updates key values.

The opener server 200 initially generates second group public parameters (gpp2) and corresponding master opening key (mok) and master linking key (mlk). The master linking key is provided to the linker server 300. When a valid signature is given, the opener server 200 outputs proof information for confirming a signer by using a master opening key. Anyone can check the output proof information freely.

The linker server 300 initially receives the master linking key (mlk) from the opener server 200. When two valid signatures are given, the linker server 300 may check whether they are linked (namely, whether the two signatures have been generated by a single signer) by using the master linking key.

The user device 400 may join as a member of an authorized group and receive a signature key issued by the key issuer server 100.

In this case, the user device 400 and the key issuer server 100 run the interactive protocol. Thereafter, the user device 400 generates a group signature with respect to a given message by using the issued signature key. When a key revocation takes place, the user device 400 updates the key values by using revocation information provided from the key issuer server 100. The signature verifying unit 500 is an algorithm that confirms the validity of the given signature. The signer information confirming unit 600 is an algorithm that verifies the validity of signer conformation information generated by the opener server 200.

The key issuer server 100 defines a group public key (gpk) by combining the generated first parameter gpp1 and second parameter gpp2, and releases the defined group public key to every participating component within the group signature system. Namely, gpk={gpp1,gpp2}. Afterwards, whenever a key revocation occurs, gpk is updated.

Figure 2:
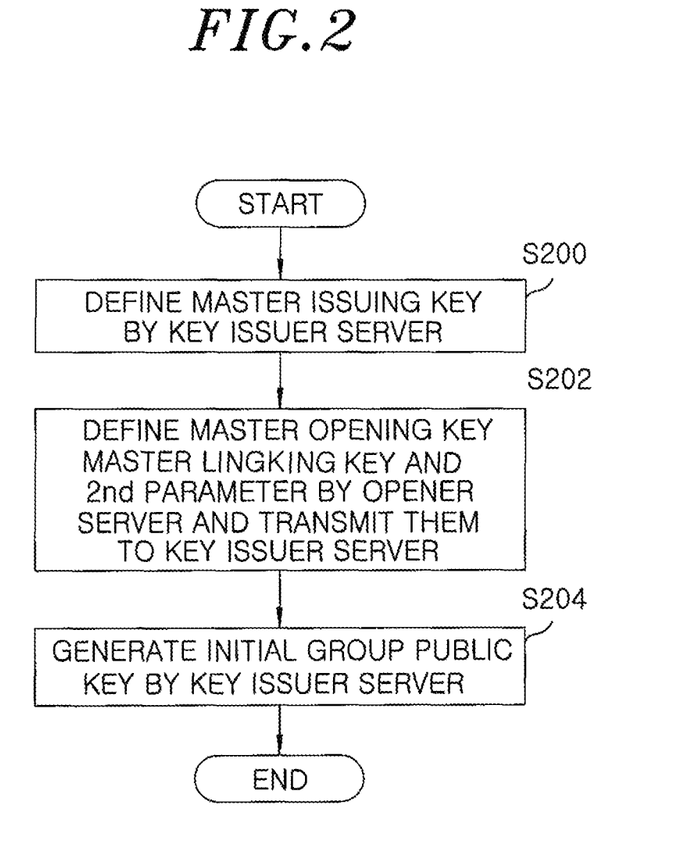
FIG. 2 is a flowchart illustrating the process of generating a group public key, a master issuing key, a master opening key, and a master linking key of a group signature system in accordance with the embodiment of the present invention.

FIG. 2 is a flowchart illustrating the process of generating an initial group public key including the group public parameters gpp1 and gpp2, and their corresponding master issuing key, master opening key and master linking key by the key issuer server 100 and the opener server 200 in accordance with an embodiment of the present invention.

Now, the embodiment of the present invention will be described in detail with reference to FIG. 2.

Upon receiving a security parameter k as an input at an early stage, the key issuer server 100 performs the following. First, the key issuer server 100 generates a pair of bilinear groups $(G_1, G_2)$ and a bilinear map combined with the bilinear groups e: $G_1 \times G_2 \to G_T$ and a hash function H: $\{0,1\} \to Z_p^*$. The key issuer server 100 selects certain elements $h_1 \in G_2$ and $g_1, g_2, g_3, g \in G_1$. Also, the key issuer server 100 selects $\theta \in Z_p^*$, calculates $h_\theta = h_1^\theta$, and then defines $\theta$ as a master issuing key (mik=$\theta$) in step S200.

Also, the opener server 200 selects $\theta_1, \theta_2, \xi_1, \xi_2 \in Z_p^*$ and calculates $u = h_1^{\xi_1}$ and $v = h_1^{\xi_2}$. In addition, the opener server 200 selects a certain element u, $v \in G_1$, and calculates $w_1 = u^{\eta_1}$, $w_2 = v^{\eta_2}$, $d_1 = u^{\xi_1}$, and $d_2 = v^{\xi_2}$. Here, $(\eta_1, \eta_2, \xi_1, \xi_2)$ is defined as a master opening key (mok=$(\eta_1, \eta_2, \xi_1, \xi_2)$) and (U,V) is defined as a master linking key (mlk=(U,V)). And, the opener server 200 transmits the second parameter gpp2=(u, v, $w_1$, $w_2$, $d_1$, $d_2$) to the key issuer server 100 in step S202.

The key issuer server 100 combines gpp2=(u, v, $w_1$, $w_2$, $d_1$, $d_2$) received from the opener server 200 with its own gpp1=(e, $G_1$, $G_2$, $g_1$, $g_2$, $g_3$, g, $h_1$, $h_\theta$, H) to create an initial group public key gpk=(e, $G_1$, $G_2$, $g_1$, $g_2$, $g_3$, g, $h_1$, $h_\theta$, H, u, v, $w_1$, $w_2$, $d_1$, $d_2$) and allows the initial group public key to be used freely in step S204. The initial public key is updated whenever a key revocation occurs. For the sake of convenience, it is assumed that the initial group public key is denoted as $gpk_0$, and parameters in the group public key managed by the key issuer server 100 and the opener server 200 can be verified by using a freely authenticated method.

Figure 3:
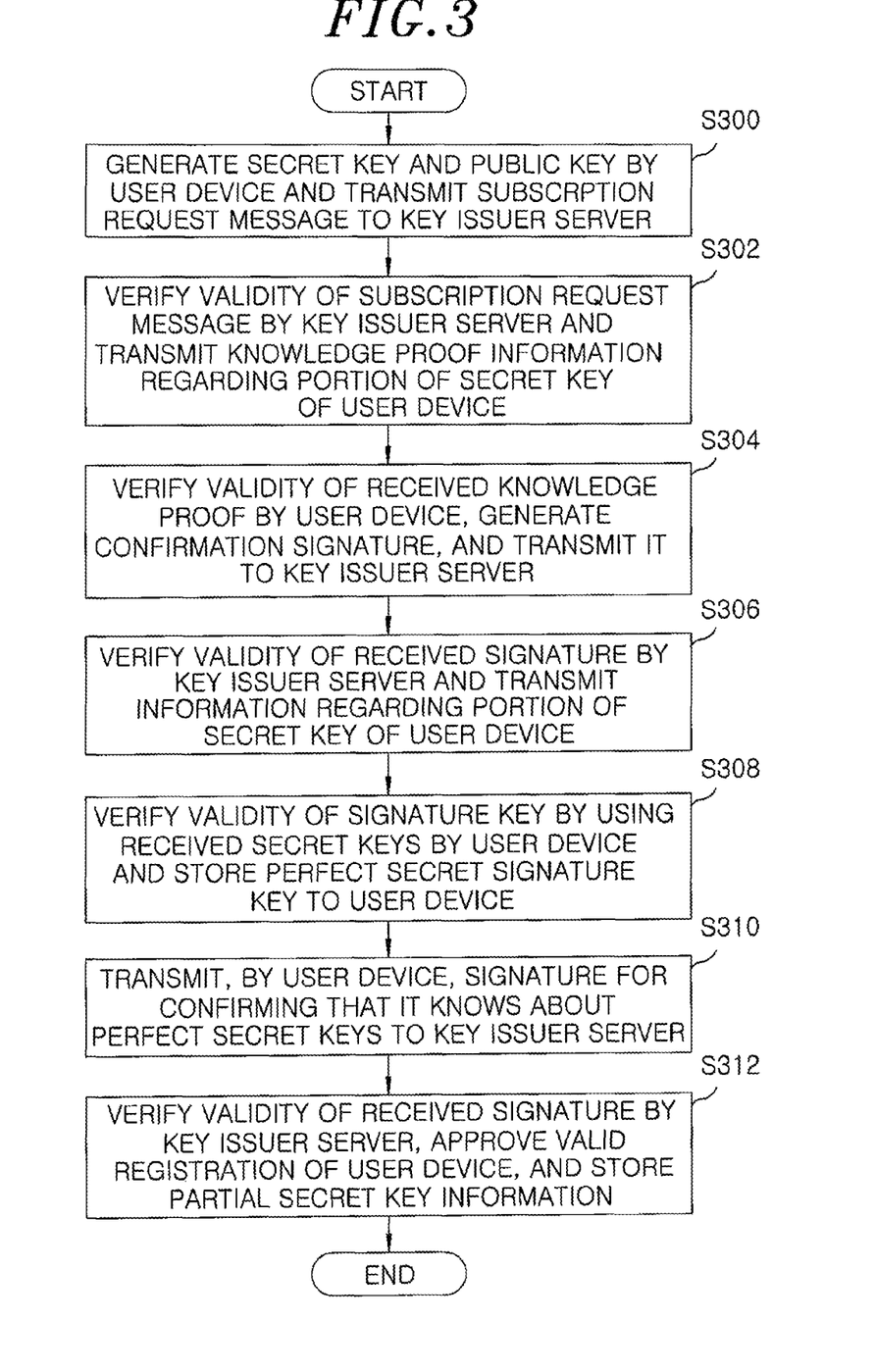
FIG. 3 is a flowchart illustrating the process of generating a signature key between a key issuer server and a user device in accordance with the embodiment of the present invention.

FIG. 3 is a flowchart illustrating the process of generating a signature key between the key issuer server 100 and the user device 400 in accordance with an embodiment of the present invention.

Now, the embodiment of the present invention will be described in detail with reference to FIG. 3.

First, the user device 400, which wants to join a group newly, and the key issuer server 100 interactively perform the following process. In this case, it is assumed that an authentication and security channel have been already established between the two participants. In the following description, Ext-Commit denotes an extractable commitment scheme providing perfect binding and computationally hiding. When trapdoor information is given, a committed value can be recovered. NIZKEqDL(a,b,c) denotes a non-interactive zero-knowledge proof scheme verifying that a value committed to 'a' and $\log_c b$ are identical.

In addition, NIZKEqDL(B,D) denotes a non-interactive zero-knowledge proof scheme verifying knowledge about $\log_D B$.

It is assumed that an initial group public key $gpk_0=(e, g_1, g_2, g_3, T)$ and a current group public key $gpk_k=(e, \tilde{g}_1, \tilde{g}_2, \tilde{g}_3, T)$ are given (where T=(e, $h_1$, $h_\theta$, u, v, $w_1$, $w_2$, $d_1$, $d_2$, H)). Hereinafter, the user device 400 uses a general signature scheme (which is available for PKI-based form) $\Sigma$=(KGen, Sign, Vrfy). In the following description, it is assumed that each user device 400 generates a pair of a public key and a secret key for using the signature scheme $\Sigma$=(KGen, Sign, Vrfy) in advance.

(1) The user device 400 selects a certain random number $Z_i \in Z_p^*$ and calculates $upk[i]=Z_i=g_3^{z_i}$. Also, the user device 400 generates $T_U(C_U=\text{Ext-Commit}(Z_i),$ NIZKEqDL ($C_U$, $Z_i, g_3$)), and then transmits a subscription request message (Join, $ID_i$, $(upk[i]=Z_i, T_U)$) to the key issuer server 100 in step S300. Here, $(upk[i]=Z_i, T_U)$ serves as a proof of possession (POP) of a private key.

(2) The key issuer server 100 receives the subscription request message (Join, $ID_i$, $(upk[i]=Z_i, T_U)$) and then verifies the validity of $(upk[i]=Z_i, T_U)$ according to a predetermined method. When $(upk[i]=Z_i, T_U)$ is valid, the key issuer server 100 checks whether $(ID_i, H(g^{y_i}), y_i, \ldots, Y_{1,i}=g_2^{y_i}, Y_{2,i}=h_1^{y_i}, X_{1,i}=g^{x_i}, X_{2,i}=h_1^{x_i}, \ldots)$ is in a user registration list REG. If so, the key issuer server 100 selects $x_i \in Z_p^*$ and calculates $A_i = (g_1 g_2^{-y_i} Z_i^{-1})^{1/(\theta+x_i)} \in G_1$. However, if not, the key issuer server 100 selects $x_1, y_i \in Z_p^*$ and calculates $A_i = (g_1 g_2^{-y_i} Z_i^{-1})^{1/(\theta+x_i)} \in G_1$. In addition, the key issuer server 100 calculates $Y_{1,i}=g_2^{y_i}$, $Y_{2,i}=h_1^{y_i}$, $X_{1,i}=g^{x_i}$, $X_{2,i}=h_1^{x_i}$, $B=e(g_1 g_2^{-y_i} Z_i^{-1}, h_1)/e(A_i, h_\theta)$, and $D=e(A_i, h_1)$, and generates $T_I$=NIZKPoKDL $(Y_{1,i}, g_2)$ and $V_I$=NIZKPoKDL(B,D). The key issuer server 100 transmits $(A_i, T_I, V_I, Y_{1,i}=g_2^{y_i}, Y_{2,i}=h_1^{y_i}, X_{1,i}=g^{x_i}, X_{2,i}=h_1^{x_i})$ to the user device 400 in step S302.

(3) The user device 400 receives $(A_i, T_I, V_I, Y_{1,i}=g_2^{y_i}, X_{2,i}=h_1^{x_i})$, calculates $B=e(g_1 g_2^{-y_i} Z_i^{-1}, h_1)/e(A_i, h_\theta)$ and $D=e(A_i, h_1)$, and checks whether $T_I$ and $V_I$ are valid. Also, the user device 400 checks whether an equation $e(A_i, X_{2,i} h_\theta)=e(g_1 Y_{1,i} g_3^{-Z_i}, h_1)$ is established. When all the verifications are successful, the user device 400 generates a signature $\sigma_{2,i} \leftarrow \text{Signski}(A_i, upk[i]=Z_i, Y_{1,i}=g_2^{y_i}, X_{2,i}=h_1^{y_i})$ and transmits $\sigma_{2,i}$ to the key issuer server 100 in step S304.

(4) The key issuer server 100 receives the signature $\sigma_{2,i}$ and then verifies validity of that signature. When the signature is valid, the key issuer server 100 transmits information regarding portion of secret key $(x_i, y_i)$ to the user device 400 in step S306.

(5) The user device 400 receives, $(x_i, y_i)$, and then calculates $\tilde{A}''=(g_1'' g_2''^{-y} g_3''^{-z})^{1/(\theta+x)}$ corresponding to the current group public key by using a user key updating algorithm. And then, it is checked whether the following equation holds:

$$e(A_i, h_1^{x_i} h_\theta) = e(g_1 g_2^{-y_i} g_3^{-z_i}, h_1)$$

and $$e(A_i, \tilde{h}_1) = e(\tilde{A}_i, h_1).$$

When the equation holds, the user device 400 stably stores $usk[i]=(\tilde{A}_i, x_i, y_i, z_i, A_i)$ as a secret signature key corresponding to the current group public key in step S308. Finally, when $e(X_{1,i}, h_1)=e(g, X_{2,i})$ and $e(Y_{1,i}, h_1)=e(g_2, Y_{2,i})$ are held, the user device 400 generates a signature $\sigma_{judge,i} \leftarrow \text{Sign}_{sk_i}(A_i, upk[i]=Z_i, Y_{1,i}=g_2^{y_i}, Y_{2,i}=h_1^{y_i}, X_{1,i}=g^{x_i}, X_{2,i}=h_1^{x_i})$ with respect to a message ($A_i$, upk[i]=$Z_i$, $Y_{1,i}=g_2^{y_i}$, $Y_{2,i}=h_1^{y_i}$, $X_{1,i}=g^{x_i}$, $X_{2,i}=h_1^{x_i}$) and transmits $\sigma_{judge,i}$ to the key issuer server 100 in step S310.

(6) The key issuer server 100 receives the signature $\sigma_{judge,i}$ then verifies validity of that signature. When the signature is valid, the key issuer server 100 adds ($ID_i$, $H(g^{y_i})$, $y_i$, $A_i$, upk[i]=$Z_i$, $y_{1,i}=g_2^{y_i}$, $Y_{2,i}=h_1^{y_i}$, $X_{1,i}=g^{x_i}$, $X_{2,i}=h_1^{x_i}$, and $\sigma_{judge,i}$) to the user registration list REG in step S312.

In the above description, the structure, in which when the master linking key mlk is given, linkability can be checked regardless of the membership of the user device 400, is provided. This structure may be modified such that linkability is provided only while the user device 400 is joined and maintained as an authorized member, and in this case, the key issuer server 100 may select $y_i \in Z_p^*$ as a new value whenever a user joins in the above process (2).

Figure 4:
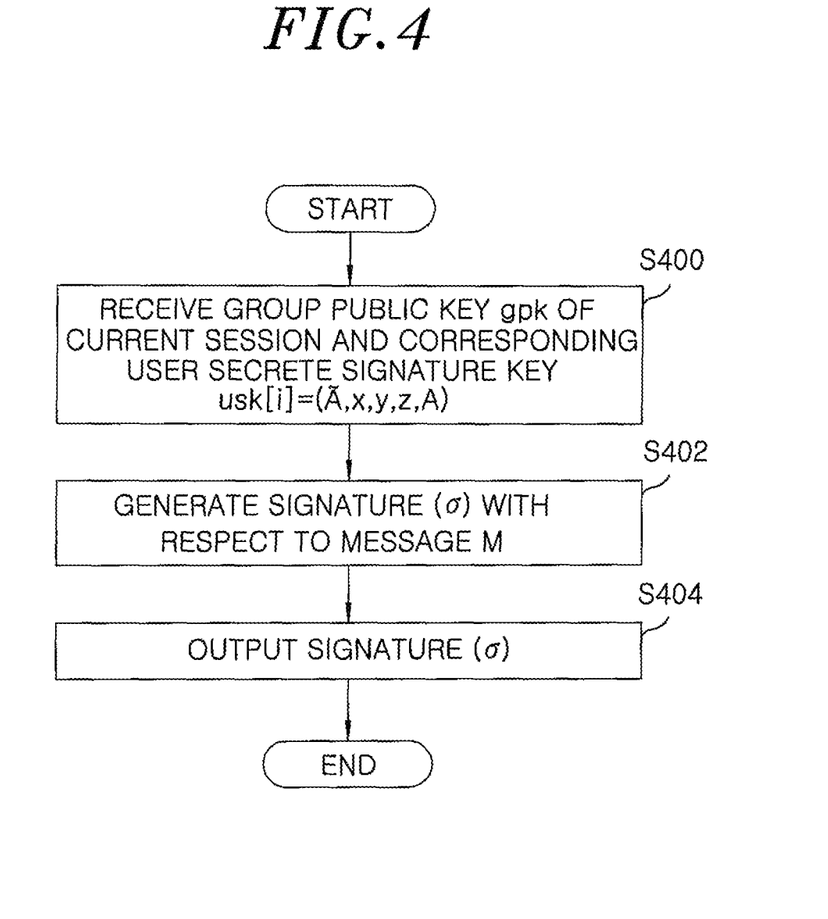
FIG. 4 is a flowchart illustrating the process of generating a group signature by an authorized user device with respect to a given message in accordance with the embodiment of the present invention.

FIG. 4 is a flowchart illustrating the process of generating a group signature by the authorized user device 400 with respect to a given message in accordance with an embodiment of the present invention.

First, when a message M is received, the user device 400 receives a given current group public key gpk, a corresponding user secret signature key usk[i]=($\tilde{A}$, x, y, z, A), and the message M as inputs in step S400. Next, the user device 400 generates a signature $\sigma$ with respect to the inputs as follows in step S402. Namely, the user device 400 first selects a random number $\alpha, \beta \leftarrow Z_p$, and calculates:

$$D_1 \leftarrow u^\alpha, D_2 \leftarrow v^\beta, D_3 \leftarrow \tilde{A}w_1^\alpha w_2^\beta, D_4 \leftarrow g^y d_1^\alpha d_2^\beta,$$

and $$\gamma \leftarrow x\alpha \bmod p, \delta \leftarrow x\beta \bmod p.$$

Further, the user device 400 selects certain random numbers $r_\alpha, r_\beta, r_\gamma, r_\delta, r_x, r_y, r_z \leftarrow Z_p$ and calculates:

$$R_1 \leftarrow u^{r_\alpha}, R_2 \leftarrow v^{r_\beta}, R_3 \leftarrow e(D_3,h_1)^{r_y} e(w_1,h_\theta)^{-r_\alpha} e(w_2,h_\theta)^{-r_\beta} e(w_2,h_1)^{-r_\gamma} e(w_2,h_1)^{-r_\delta} e(g_2,h_1)^{r_y} e(g_3,h_1)^{r_z},$$
$$R_4 \leftarrow g^{r_y} d_1^{r_\alpha} d_2^{r_\beta}, R_5 \leftarrow D_1^{r_x} u^{-r_\gamma}, R_6 \leftarrow D^{r_x} u^{-r_\delta}.$$

In addition, the user device 400 calculates:

$$c = H(M, D_1, D_2, D_3, D_4, R_1, R_2, R_3, R_4, R_5, R_6)$$

by using a hash function, and also calculates:

$$s_\alpha = r_\alpha + c\alpha, s_\beta = r_\beta + c\beta, s_\gamma = r_\gamma + c\gamma, s_\delta = r_\delta + c\delta, s_x = r_x + cx,$$
$$s_y = r_y + cy, s_z = r_z + cz.$$

Finally, the user device 400 outputs $\sigma = (D_1, D_2, D_3, D_4, c, s_\alpha, s_\beta, s_\gamma, s_\delta, s_x, s_y, s_z)$ as a signature in step S404.

In the above description, a linear encryption scheme, instead of a linear combination encryption scheme, may be used for $D_3 \leftarrow \tilde{A}w_1^\alpha w_2^\beta$ or $D_4 \leftarrow g^y d_1^\alpha d_2^\beta$. For example, $D_4 \leftarrow g^y d^{\alpha+\beta}$ instead of $D_4 \leftarrow g^y d_1^\alpha d_2^\beta$ is calculated. In this case, the generation of the relevant group public key, the generation of the proof information for the signer, the algorithm for confirming the signer proof information, and the method for checking linkability information may be appropriately corrected for consistency as necessary. The correction may be obviously made to those skilled in the art, so a description thereof will be omitted.

Figure 5:
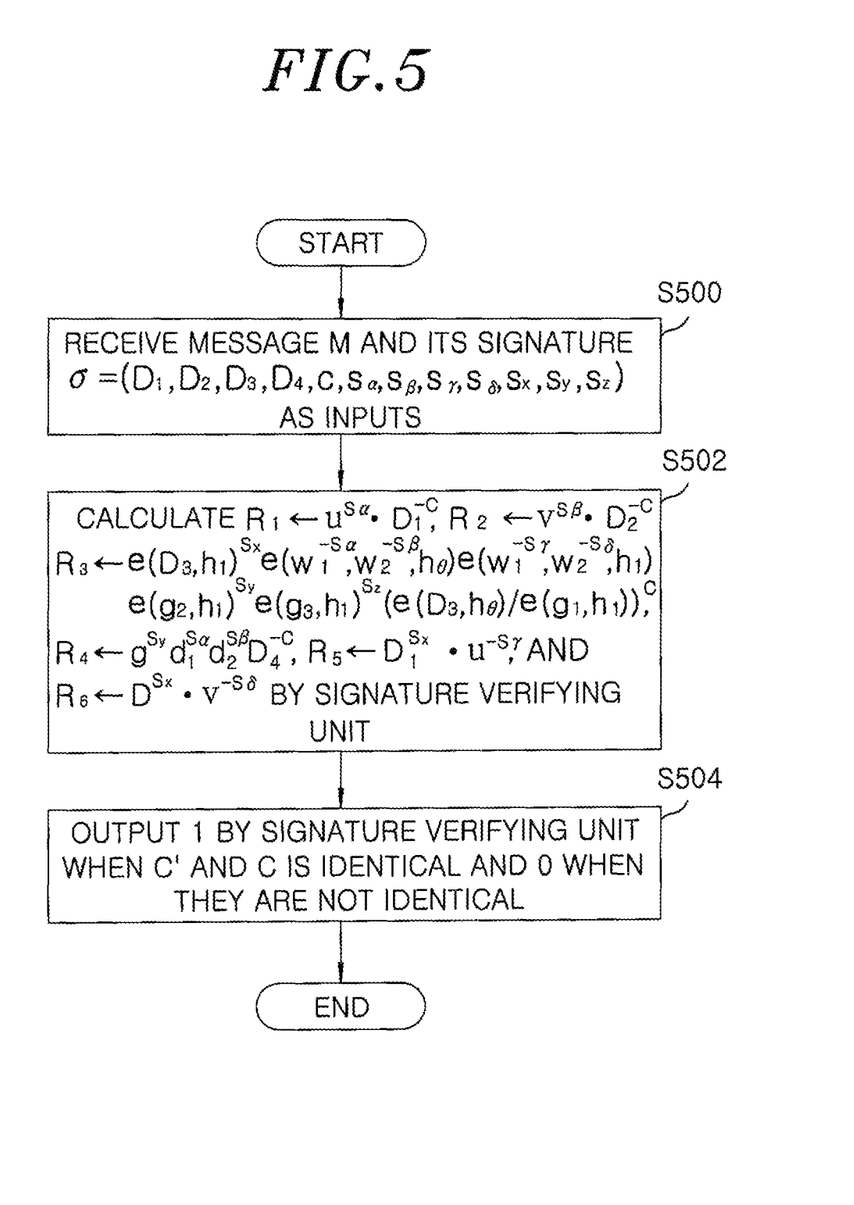
FIG. 5 is a flowchart illustrating the process of verifying, by a signature verifying unit, a group signature with respect to a message generated by the authorized user device in accordance with the embodiment of the present invention.

FIG. 5 is a flowchart illustrating the process of verifying, by the signature verifying algorithm 500, a group signature with respect to message generated by the authorized user device 400 in accordance with an embodiment of the present invention.

It is assumed that a signature $\sigma = (D_2, D_3, D_4, c, s_\alpha, s_\beta, s_\gamma, s_\delta, s_x, s_y, s_z)$ is given for a message M in step S500. Then, the signature verifying unit 500 calculates:

$$R_1 \leftarrow u^{s_\alpha} D_1^{-c}, R_2 \leftarrow v^{s_\beta} D_2^{-c}, R_3 \leftarrow e(D_3,h_1)^{s_x} e(w_1^{-s_\alpha} w_2^{-s_\beta}, h_\theta) e(w_1^{-s_\gamma} w_2^{-s_\delta}, h_1) e(g_2,h_1)^{s_y} e(g_3,h_1)^{s_z} (e(D_3,h_\theta)/e(g_1,h_1))^c, R_4 \leftarrow g^{s_y} d_1^{s_\alpha} d_2^{s_\beta} D_4^{-c},$$
$$R_5 \leftarrow D_1^{s_x} u^{-s_\gamma},$$

and $$R_6 \leftarrow D_2^{s_x} v^{-s_\delta}$$

in step S502.

And then, the signature verifying unit 500 calculates a hash function value $c' = H(M, D_1, D_2, D_3, D_4, R_1, R_2, R_3, R_4, R_5, R_6)$, and then checks whether C and C' are identical. When they are identical, the signature verifying unit 500 outputs 1 indicating that the given signature is valid, and if not, it outputs 0 in step S504.

Figure 6:
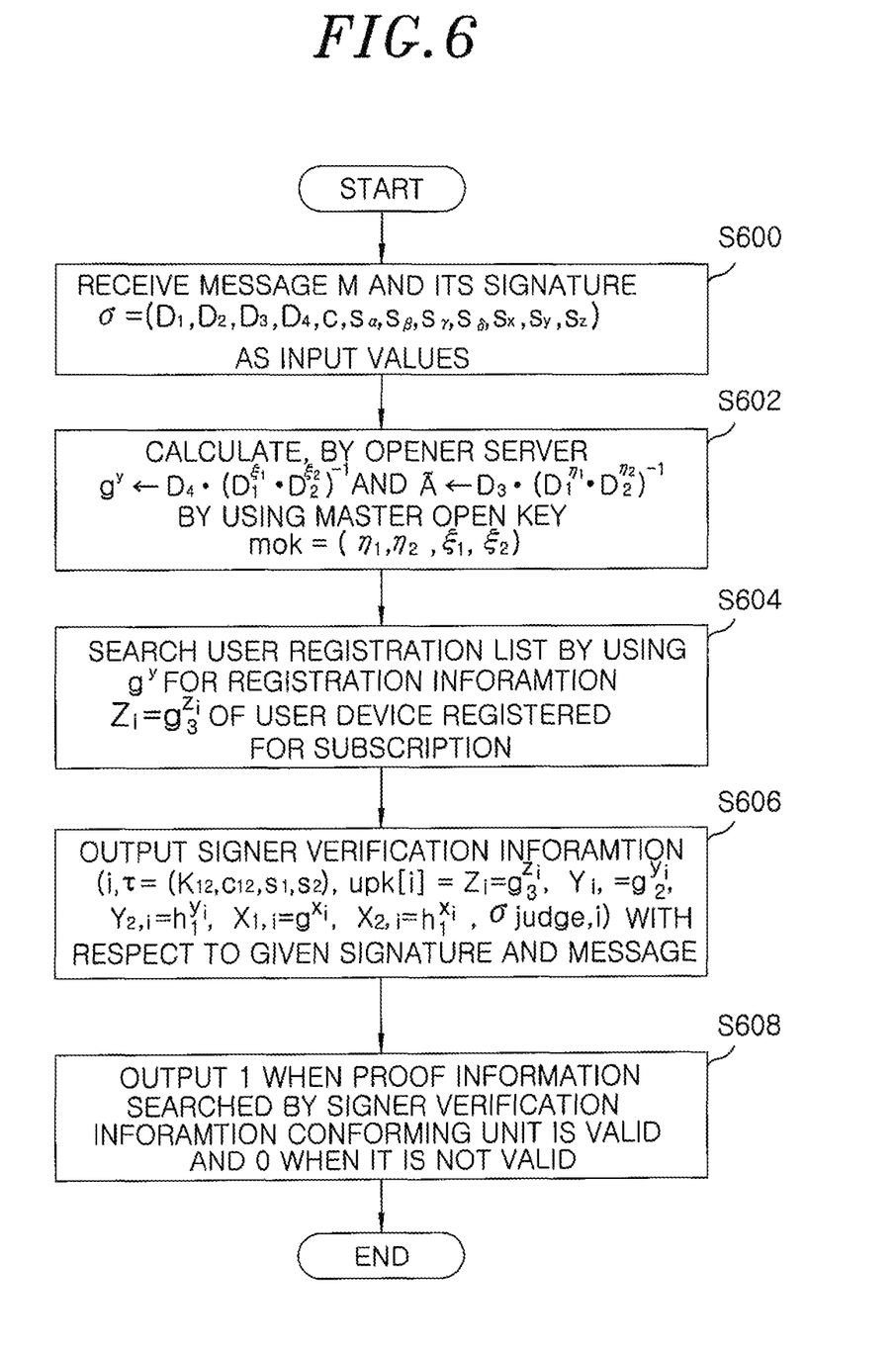
FIG. 6 is a flowchart illustrating the process of generating proof information regarding a group signature with respect to a message generated by the authorized user device and verifying the validity of the proof information in accordance with the embodiment of the present invention.

FIG. 6 is a flowchart illustrating the process of generating proof information confirming who the signer is by using a master opening key for a group signature with respect to a message generated by the authorized user device 400 and verifying the validity of the proof information by using the signer information confirming unit 600 in accordance with an embodiment of the present invention.

It is assumed that a signature $\sigma = (D_1, D_2, D_3, D_4, c, s_\alpha, s_\beta, s_\gamma, s_\delta, s_x, s_y, s_z)$ with respect to a message M is given in step S600. The opener server 200 generates proof information $\tau$ by using the master opening key mok=$(\eta_1, \eta_2, \xi_1, \xi_2)$ as follows. The opener server 200 calculates $H(g^y)$ and $\tilde{A}$ through $g^y \leftarrow D_4 (D_1^{\xi_1} D_2^{\xi_2})^{-1}$ and $\tilde{A} \leftarrow D_3 (D_1^{\eta_1} D_2^{\eta_2})^{-1}$ in step S602.

Subsequently, the opener server 200 efficiently searches the user registration list REG for a user index i satisfying $H(g^y) = H(g^{y_i})$ and information upk[i]=$Z_i$=$g_3^{z_i}$, $Y_{1,i}=g_2^{y_i}$, $Y_{2,i}=h_1^{y_i}$, $X_{1,i}=g^{x_i}$, $X_{2,i}=h_1^{x_i}$ corresponding to the user index by using $H(g^y)$ in step S604. Herein, upk[i]=$Z_i$=$g_3^{z_i}$ is information registered by the signer with its public key when it joined. The opener server 200 selects a certain random number $r_1, r_2 \leftarrow Z_p$ and calculates $K_{12} = D_1^{\eta_1} D_2^{\eta_2}$, $W_1 = u^{r_1}$, $W_2 = v^{r_2}$, $W_{12} = D_1^{r_1} D_2^{r_2}$, $c_{12} = H(\sigma, u, v, K_{12}, W_1, W_2, W_{12})$, and $s_1 = r_1 + c_{12}\eta_1$, $s_2 = r_2 + c_{12}\eta_2$ (mod p). And then, the opener server 200 outputs (i, $\tau = (K_{12}, c_{12}, s_1, s_2)$ upk[i]=$Z_i$=$g_3^{Z_i}$, $Y_{1,i}=g_2^{y_i}$, $Y_{2,i}=h_1^{y_i}$, $X_{1,i}=g^{x_i}$, $X_{2,i}=h_1^{x_i}$, $\sigma_{judge,i}$) as signer proof information with respect to the given signature and message in step S606. Here, $\sigma_{judge,i}$ is a general signature (generated by using the signature scheme $\Sigma$ by the signer i) verifying that the signer i knows about the exponent values $x_i$, $y_i$, $z_i$.

The signer information confirming unit 600 checks whether the following equation holds with respect to the signature $\sigma = (D_1, D_2, D_3, D_4, c, s_\alpha, s_\beta, s_\gamma, s_\delta, s_x, s_y, s_z)$ for the given message M and the signer proof information (i, $\tau = (K_{12}, c_{12}, s_1, s_2)$, upk[i]=$Z_i$=$g_3^{Z_i}$, $Y_{1,i}=g_2^{y_i}$, $Y_{2,i}=h_1^{y_i}$, $X_{1,i}=g^{x_i}$, $X_{2,i}=h_1^{x_i}$, $\sigma_{judge,i}$).

(1) First, the signer information confirming unit 600 calculates:

$$c'12 = H(\sigma, u, v, K_{12}, u^{s_1} w_1^{-c_{12}}, v^{s_2} w_2^{-c_{12}} D_1^{s_1} D_2^{s_2} K_{12}^{-c_{12}})$$

and checks whether $c'_{12} = c_{12}$ holds.

(2) The signer information confirming unit 600 checks whether $e(D_3 K_{12}^{-1}, X_{2,i} h_\theta) = e(g_1 Y_{1,i}^{-1} Z_{1,i}^{-1} \tilde{h}_1)$ holds. Here, $\tilde{h}_1$ is a value included in the current group public key, and $g_1$ is a value included in the initial group public key $gpk_0$. When the above equalities are all hold, the signer information confirming unit 600 outputs 1 indicating that they are valid, or otherwise, the signer information confirming unit 600 outputs 0 in step S608.

Figure 7:
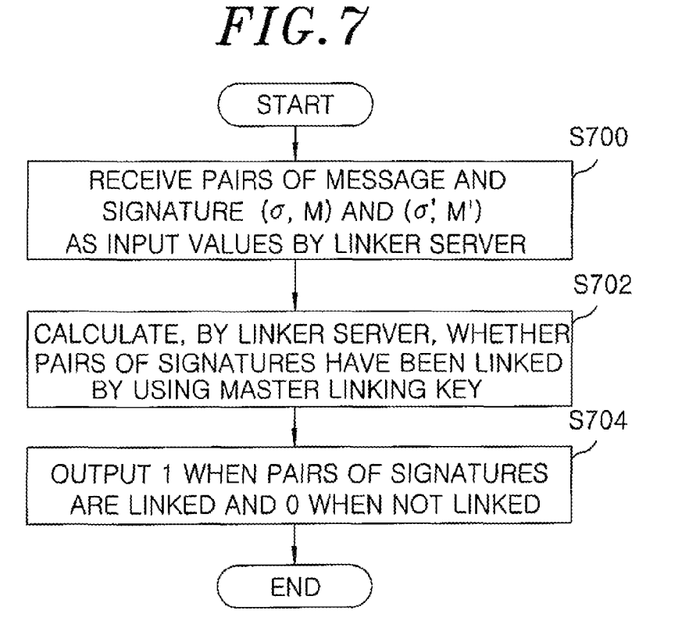
FIG. 7 is a flowchart illustrating the process of confirming whether signature values have been linked by using a master linking key with respect to two group signatures generated by the authorized user device in accordance with the embodiment of the present invention.

FIG. 7 is a flowchart illustrating the process of confirming whether signature values have been linked by using a master linking key with respect to two group signatures generated by the authorized user device 400 in accordance with an embodiment of the present invention.

When pairs of given messages and signatures (σ, M) and (σ', M') are received in step S700, the linker server 300 calculates $B_1 = e(D_4, h_1) [e(D_1, U)e(D_2, V)]^{-1}$ and $B_2 = e(D'_4, h_1) [e(D'_1, U)e(D'_2, V)]^{-1}$ by using the master linking key mlk= (U,V), and then checks whether $B_1 = B_2$ HOLDS in step S702. When the equation is established, the linker server 300 outputs 1 indicating that they are linked, or otherwise, the linker server 300 outputs 0 in step S704.

Selectively, it can be checked whether an equation $e(D_4/D'_4, h_1) = e(D_1/D'_1, U) e(D_2/D'_2, V)$ is established in order to increase the efficiency of calculation.

Figure 8:
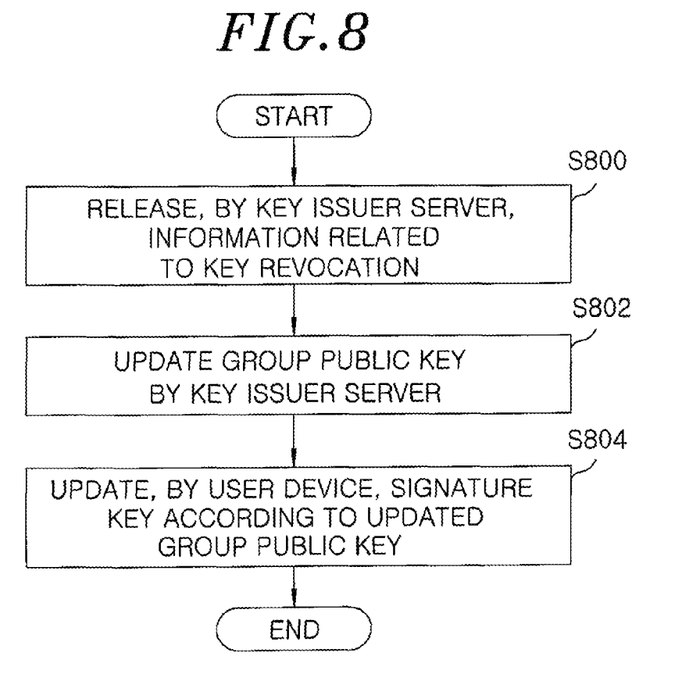
FIG. 8 is a flowchart illustrating the process of releasing relevant information and updating a group public key by a key issuer server and updating, by the authorized user device, its signature key, when a key revocation occurs in accordance with the embodiment of the present invention.

FIG. 8 is a flowchart illustrating the process of releasing relevant information and updating a group public key by the key issuer server 100, and updating, by the authorized user device 400, its signature key, when a key revocation occurs, in accordance with an embodiment of the present invention.

It is assumed that the sets of keys are revoked at every session and a session is denoted by using an index variable k in order to distinguish each session. It is also assumed that k is increased by 1 at a time when a session is changed. It is also assumed that an initial group public key $gpk_0 = (T, g_1, g_2, g_3)$ and a current group public key $gpk_{k-1} = (T, g'_1, g'_2, g'_3)$ are given (where $T = (e, G_1, G_2, g, h_1, h_\theta, H, u, v, w_1, w_2, d_1, d_2)$).

In order to revoke given key values and update keys, first, the key issuer server 100 releases a revocation list RI= $\{(T_{1,i} = g_1^{1/(\theta + x_{k,i})}, T_{2,i} = g_2^{1/(\theta + x_{k,i})}, T_{3,i} = g_3^{1/(\theta + x_{k,i})}, x_{k,i}) | i = 1, \ldots, r_k\}$ in step S800.

(1) In order to update the group public key from $gpk_{k-1}$ to $gpk_k$, the key issuer server 100 calculates $$g''_1 = g'_1 \prod_{i=1}^{r_k} T_{1,i}, \quad g''_2 = g'_2 \prod_{i=1}^{r_k} T_{2,i}, \text{ and } g''_3 = g'_3 \prod_{i=1}^{r_k} T_{3,i}.$$

The updated group public key is $gpk_k = (T, g''_1, g''_2, g''_3)$, as in step S802.

(2) In order to update its signature key from $uSk_{k-1}[i] = (A', x, y, z, A)$ to $uSk_k = [i]$, the user device 400 calculates:

$$A'' = A' \prod_{i=1}^{r_k} [(T_{1,i} T_{2,i}^{-y} T_{3,i}^{-z} A^{-1})]^{1/(x - x_{k,i})} = (g''_1 g''_2{}^{-y} g''_3{}^{-z})^{1/(\theta + x)}.$$

An updated signature key corresponding to the current group public key $gpk_k = (T, g''_1, g''_2, g''_3)$ is set to be $uSk_k[i] = (A'', x, y, z, A)$ in step S804.

Figure 9:
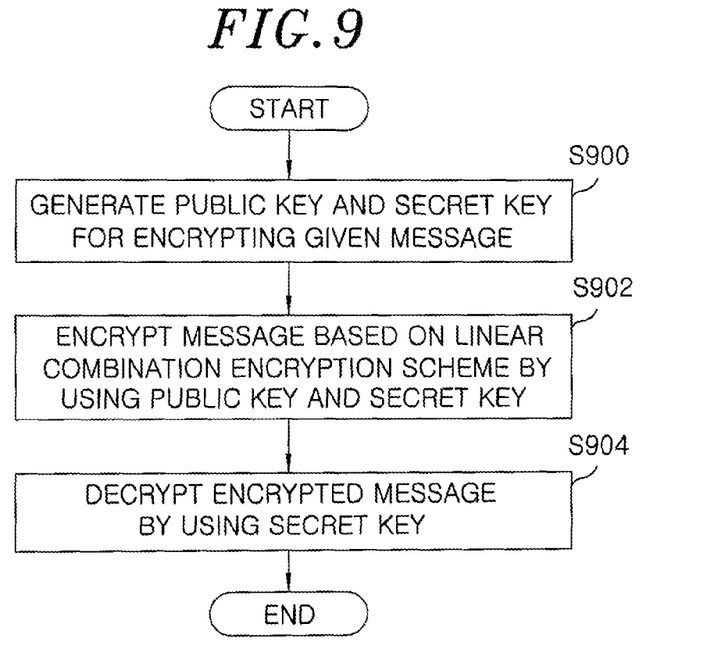
FIG. 9 is a flowchart describing a linear combination encryption (LCE) scheme in accordance with the embodiment of the present invention.

FIG. 9 is a flowchart describing the linear combination encryption (LCE) scheme in accordance with the embodiment of the present invention.

A key generation algorithm, an encryption algorithm and a decryption algorithm are defined as follows:

(1) The key generation algorithm: A first user generates an algebraic group $G_1$ as a prime order p, and a certain generation source u,v of $G_1$. And then, x and y are selected from a set $Z_P^*$, and $w_1 = u^x$ and $w_2 = u^y$ are calculated. Here, $G_1$ is expressed as a multiplicative group. The user defines a public key as $(G_1, u, v, w_1, w_2)$ and releases it, and stably stores the corresponding secret key (x,y) in step S900;

(2) Encryption algorithm: When a message $M \in G_1$ is given and a public key $(G_1, u, v, w_1, w_2)$ and the corresponding secret key (x,y), a and b are selected from the set $Z_p^*$, $c_1 = u^a$, $c_2 = v^b$, and $D_1 = M w_1^a w_2^b$ are calculated, and then a ciphertext $(C_1, C_2, D_1)$ is output in step S902; and (3) Decryption algorithm: In order to decrypt the given ciphertext $(C_1, C_2, D_1)$, $M = D_1 C_1^{-x} C_2^{-y}$ is calculated by using the secret key (x,y) to recover the message in step S904.

Figure 10:
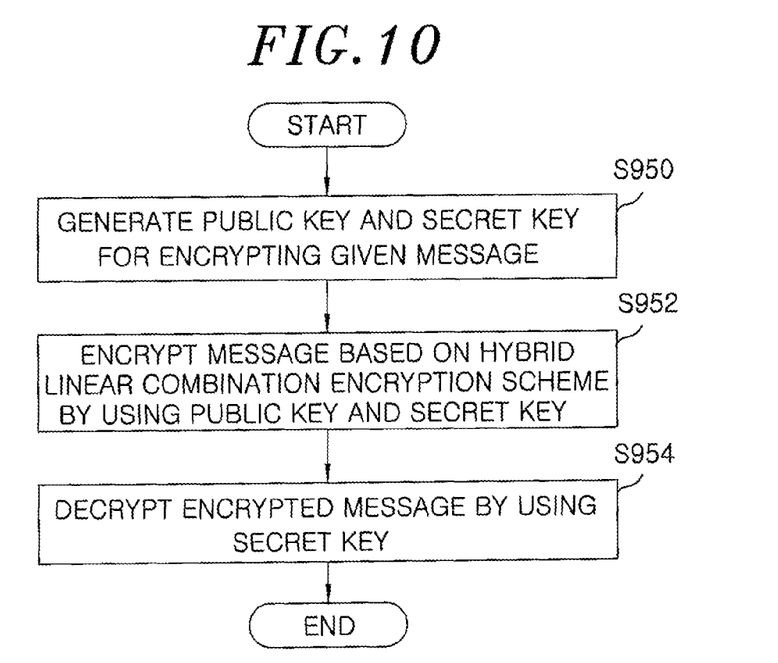
FIG. 10 is a flowchart describing a hybrid LCE (HLCE) scheme in accordance with the embodiment of the present invention.

FIG. 10 is a flowchart describing the hybrid LCE (HLCE) scheme obtained by effectively extending the LCE scheme in order to encrypt a tuple of n messages $(M_1, \ldots, M_n)$ for $M_i \in G_1$ in accordance with an embodiment of the present invention. This will be now described in detail.

A key generation algorithm, an encryption algorithm, and a decryption algorithm are defined as follows:

(1) Key generation algorithm: A first user generates an algebraic group $G_1$ as a prime order p, and a certain generation source u,v of $G_1$. And then, x and y are selected from a set $Z_P^*$, and $W_{2i-1} = u^{x_i}$ and $W_{2i-1} = v^{y_i}$ are calculated with respect to $i = 1, \ldots, n$. Here, it is expressed as a multiplicative group. A public key is defined as $(G_1, u, v, w_1, w_2, \ldots, w_{2n-1}, w_{2n})$ and releases it, and stably stores a corresponding secret key $(x_1, y_1, \ldots, x_n, y_n)$ in step S950;

(2) Encryption algorithm: When a tuple of n messages $(M_1, \ldots, M_n)$ for $M_i \in G_1$ is given, a and b are randomly selected from the set $Z_P^*$, $c_1 = u^a$, $c_2 = v^b$, and $D_1 = M w_1^a w_2^b, \ldots, D_j = M_j w_{2j-1}^a w_j^b, \ldots, D_n = M_n w_{2n-1}^a w_n^b$ are calculated, and then a ciphertext $(C_1, C_2, D_1, \ldots, D_n)$ is output in step S952; and (3) Decryption algorithm: In order to decrypt the given ciphertext $(C_1, C_2, D_1, \ldots, D_n)$, $M_j = D_j C_1^{-x_j} C_2^{-y_j}$ is calculated by using the secret key $(x_1, y_1, \ldots, x_n, y_n)$ to recover the message in step S954.

As described above, the present invention provides a method which is capable of protecting user privacy by using a group signature scheme that can control anonymity, including a controllable linkability, in various levels.

In accordance with the present invention, anonymity can be combined with various conditions and policies through a provided controllable linkability so as to be segmented.

Basically, a configuration scheme provides all the functions of the existing known group signature scheme and security characteristics. Namely, it is not possible to simply check a signer or linkability information from a given signature value. However, when particular keys are given, namely, when a particular opening key is given, a signer can be checked, and also, when a particular linking key is given, signature values of a signer can be checked to be linked to each other (namely, they have been generated by one signer or a signer key).

In addition, the present invention provides a method for stably encrypting and decrypting a message in an algebraic group in which a decisional Diffie-Hellman (DH) problem is easy. Moreover, the present invention can be applicable to various next-generation IT application fields such as an anonymity-based web service, a medical information protection, a cloud computing authentication, and the like, as well as to application fields in which the existing group signature schemes, such as an anonymity authentication (VSC) for a traffic network, a future Internet anonymity packet authentication, and the like, are available.

Although the present invention has been described with respect to the particular embodiments, various changes or modifications may be made without departing the scope of the present invention. That is, although the present invention has been described with respect to a group signature scheme providing a controllable linkability, a linear combination encryption scheme and a hybrid linear combination encryption with reference to the illustrated drawings, it will be understood by those skilled in the art that various changes and modification may be made.

While the invention has been shown and described with respect to the particular embodiments, it will be understood by those skilled in the art that various changes and modification may be made without departing from the scope of the invention as defined in the following claims.

What is claimed is:

1. A group signature system comprising:
a key issuer server;
an opener server;
a linker server;
a signature verifying unit; and
a user device,
wherein the key issuer server includes
a processor; and
a non-transitory computer readable medium with computer executable instructions stored thereon which, when executed by the processor, perform a method comprising:
generating a first parameter of a group public key,
generating a corresponding master issuing key,
generating a group public key using the first parameter of a group public key and a second parameter of a group public key received from the opener server,
verifying a validity of a subscription request message received from the user device requesting a membership in the group signature system, and
storing a secret signature key corresponding to the user device membership in the group signature system,
wherein the opener server includes
a processor; and
a non-transitory computer readable medium with computer executable instructions stored thereon which, when executed by the processor, perform a method comprising:
generating the second parameter of a group public key,
transmitting the second parameter of a group public key to the key issuer server,
defining a master opening key, and
defining a master linking key, wherein the master linking key is a secret key,
wherein the user device includes
a processor; and
a non-transitory computer readable medium with computer executable instructions stored thereon which, when executed by the processor, perform a method comprising:
receiving a message,
receiving the group public key,
receiving a secret signature key corresponding to the group public key,
generating for the message a group signature corresponding to the group public key,
selecting a random number $Z_i \in Z_p^*$,
calculating $upk[1]=Z_i=g_3^{Z_i}$,
generating $T_U$ ($C_U$=Ext-Commit($Z_i$), NIZKEqDL ($C_U, Z_i, g_3$)), wherein Ext-Commit is an extractable commitment scheme providing perfect binding and computational hiding, and NIZKEqDL( ) is a non-interactive zero-knowledge proof scheme, and
transmitting the subscription request message (Join, $Id_i$, ($upk[i]=Z_i, T_U$)), wherein the subscription request message includes $upk[i]=Z_i, T_U$ as a proof of possession of a personal key,
wherein the signature verifying unit is configured to includes a processor; and
a non-transitory computer readable medium with computer executable instructions stored thereon which, when executed by the processor, perform a method comprising:
receiving the message and the group signature corresponding to the group public key, and
checking whether the group signature received from the user device is valid, and
wherein the linker server includes
a processor; and
a non-transitory computer readable medium with computer executable instructions stored thereon which, when executed by the processor, perform a method comprising:
receiving the master linking key from the opener server,
receiving from the user device at least two pairs of a message and a group signature as input values, and
determining whether said pairs are linked using the master linking key when each of the group signatures correspond to the group public key.

2. The system of claim 1, further comprising:
a signer information confirming unit including
a processor; and
a non-transitory computer readable medium with computer executable instructions stored thereon which, when executed by the processor, perform a method comprising:
outputting a user device verification information for the message and corresponding group signature provided by the user device using a proof information generated by the opener server.

3. The system of claim 2, wherein the computer executable instructions stored on the opener server, when executed by the processor, further performs
receiving the message and corresponding group signature from the user device,
generating the proof information using the master opening key, and
providing the proof information to the signer information confirming unit.

4. The system of claim 1, wherein the computer executable instructions stored on the key issuer server, when executed by the processor, further performs updating the group public key when a key revocation occurs upon change of a session.

5. The system of claim 1, wherein the computer executable instructions stored on the key issuer server, when executed by the processor, further performs defining the master issuing key by using a pair of bilinear groups and a bilinear map coupled with the pair of bilinear groups.

6. The system of claim 1, wherein a security channel for authentication is established between the user device and the key issuer server.

7. The system of claim 1, wherein the computer executable instructions stored on the key issuer server, when executed by the processor further performs
generating a pair of bilinear groups ($G_1, G_2$),
generating a bilinear map combined with the pair of bilinear groups $$e: G_1 \times G_2 \rightarrow G_T,$$

providing a hash function $$H: \{0,1\} \rightarrow Z_P^*, \text{ and}$$

selecting elements $$h_1 \in G_2,$$

$$g_1, g_2, g_3, g \in G_1, \text{ and}$$

$$\theta \in Z_P,$$

wherein the first parameter of the group public key is generated as $$gpp1=(e, G_1, G_2, g_i, g_2, g_3, g, h_1, h_\theta, H).$$

8. The system of claim 7, wherein the computer executable instructions stored on the key issuer server, when executed by the further performs calculating $h_\theta = h_1^\theta$,
wherein the master issuing key is generated as $$mik=\theta.$$

9. A group signature method comprising:
generating, by a key issuer server, a first parameter of a group public key;
generating, by the key issuer server, a corresponding master issuing key;
generating, by the key issuer server, a group public key using the first parameter of a group public key and a second parameter of a group public key received from an opener server;
issuing, by the key issuer server, a signature key to a user device when the user device joins;
verifying, by the key issuer server, a validity of a subscription request message received from the user device requesting a membership in the group signature system;
storing, by the key issuer server, a secret signature key corresponding to the user device membership in the group signature system;
generating, by the opener server, a second parameter of the group public key;
transmitting, by the opener server, the second parameter of a group public key to the key issuer server,
defining, by the opener server, a master opening key;
defining, by the opener server, a master linking key, wherein the master linking key is a secret key;
receiving, by a user device, a message;
receiving, by the user device, the group public key;
receiving, by the user device, a secret signature key corresponding to the group public key;
generating, by the user device, for the message a group signature corresponding to the group public key,
selecting, by the user device, a random number $Z_i \epsilon z_P^*$;
calculating, by the user device, $upk[1]=Z_i=g_3^{Z_i}$;
generating, by the user device, $T_U$ ($C_U$=Ext-Commit($Z_i$), NIZKEqDL ($C_U$, $Z_i$, $g_3$)), wherein Ext-Commit is an extractable commitment scheme providing perfect binding and computational hiding, and NIZKEqDL( ) is a non-interactive zero-knowledge proof scheme;
transmitting, by the user device, the subscription request message (Join, $Id_i$, ($upk[i]=Z_i,T_U$)), wherein the subscription request message includes $upk[i]=Z_i$, $T_U$ as a proof of possession of a personal key;
receiving, by a signature verifying unit, the message and the group signature corresponding to the group public key:
checking, by a signature verifying unit, whether the group signature received from the user device is valid;
receiving, by a linker server, the master linking key from the opener server;
receiving, by a linker server, from the user device at least two pairs of a message and a group signature as input values; and
receiving, by a linker server, whether said pairs are linked using the master linking key when each of the group signatures correspond to the group public key.

10. The method of claim 9, further comprising
releasing, by the key issuer server, a revocation list for updating keys when a session is changed;
generating, by the key issuer server, a new group public key and providing the new group public key to a user device;
updating, by the user device, the group public key with the new group public key; and
updating, by the user device, a signature key corresponding to the new group public key.

11. The method of claim 9, further comprising outputting, by a signer information confirming unit, a user device verification information for the message and corresponding group signature provided by the user device using a proof information generated by the opener server.

12. The method of claim 11, further comprising
receiving, by the opener server, the message and corresponding group signature from the user device;
generating, by the opener server, the proof information using the master opening key; and
providing, by the opener server, the proof information to the signer information confirming unit.

13. The method of claim 9, further comprising updating, by the key issuer server, the group public key when a key revocation occurs upon change of a session.

14. The method of claim 9, wherein the key issuer server defines the master issuing key by using a pair of bilinear groups and a bilinear map coupled with the pair of bilinear groups.

15. The method of claim 9, wherein a security channel for authentication is established between the user device and the key issuer server.

16. The method of claim 9, further comprising
generating, by the key issuer server, a pair of bilinear groups ($G_1$, $G_2$);
generating, by the key issuer server, a bilinear map combined with the pair of bilinear groups $$e: G_1 \times G_2 \rightarrow G_T;$$

providing, by the key issuer server, a hash function $$H:\{0,1\} \rightarrow Z_P^*; \text{ and}$$

selecting, by the key issuer server, elements $$h_1 \epsilon G_2,$$

$$g_1, g_2, g_3, g \epsilon G_1, \text{ and}$$

$$\theta \epsilon Z_P,$$

wherein the first parameter of the group public key is generated as $$gpp1=(e,G_1,G_2,g_1,g_2,g_3,g,h_1,h_\theta,H).$$

17. The method of claim 16, further comprising calculating, by the key issuer server, $$h_\theta = h_1^\theta,$$

wherein the master issuing key is generated as $$mik=\theta.$$

* * * * *